(12) United States Patent
Owens

(10) Patent No.: US 8,232,235 B2
(45) Date of Patent: Jul. 31, 2012

(54) TERNARY AZEOTROPES CONTAINING 1,1,1,2,2,3,4,5,5,5-DECAFLUORO-3-METHOXY-4-(TRIFLUOROMETHYL)-PENTANE 5 AND COMPOSITIONS MADE THEREFROM

(75) Inventor: John G. Owens, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 328 days.

(21) Appl. No.: 12/557,610

(22) Filed: Sep. 11, 2009

(65) Prior Publication Data

US 2011/0065620 A1    Mar. 17, 2011

(51) Int. Cl.
*C11D 3/44* (2006.01)
*C10M 131/10* (2006.01)

(52) U.S. Cl. ........ 508/577; 252/8.91; 252/67; 252/88.2; 106/182.1; 510/505

(58) Field of Classification Search .................. 252/8.91, 252/67, 88.2; 510/505; 106/182.1; 508/577
See application file for complete search history.

(56) References Cited

U.S. PATENT DOCUMENTS

| | | | |
|---|---|---|---|
| 4,715,900 A | 12/1987 | Connon et al. | |
| 5,542,983 A * | 8/1996 | Hamilton et al. | 134/10 |
| 6,030,934 A | 2/2000 | Owens et al. | |
| 6,764,990 B1 | 7/2004 | Bogdan et al. | |
| 7,071,154 B2 | 7/2006 | Rajtar et al. | |
| 7,276,471 B2 | 10/2007 | Hitters et al. | |
| 7,476,331 B2 | 1/2009 | Merchant et al. | |
| 7,625,854 B2 | 12/2009 | Owens | |
| 7,629,307 B2 | 12/2009 | Owens | |
| 2005/0070455 A1 | 3/2005 | Hesselroth et al. | |
| 2006/0180785 A1* | 8/2006 | Merchant et al. | 252/67 |
| 2009/0186799 A1 | 7/2009 | Owens | |
| 2009/0186800 A1 | 7/2009 | Owens | |

FOREIGN PATENT DOCUMENTS

| | | |
|---|---|---|
| JP | 2003/165998 | 10/2003 |
| JP | 2003/165999 | 10/2003 |
| JP | 2009/149701 | 7/2009 |

OTHER PUBLICATIONS

ASTM International: Standard Test Methods for Flash Point of Liquids by Small Closed-Cup Apparatus, D 3278-96[e1], pp. 1-8, Sep. 11, 2009.

* cited by examiner

*Primary Examiner* — Walter D Griffin
*Assistant Examiner* — Taiwo Oladapo
(74) *Attorney, Agent, or Firm* — Stephen F. Wolf

(57) ABSTRACT

Compositions are provided that include blends that consist essentially of 1,1,1,2,2,3,4,5,5,5-decafluoro-3-methoxy-4-(trifluoromethyl)pentane, trans-1,2-dichloroethylene, and a third component. The third component is selected from methanol, ethanol, isopropanol, t-butanol, and 1-propanol. The blends form ternary azeotropes. Provided compositions can be useful for cleaning electronic parts, as coating solvent components, as heat transfer fluids, and as lubricants.

19 Claims, 1 Drawing Sheet

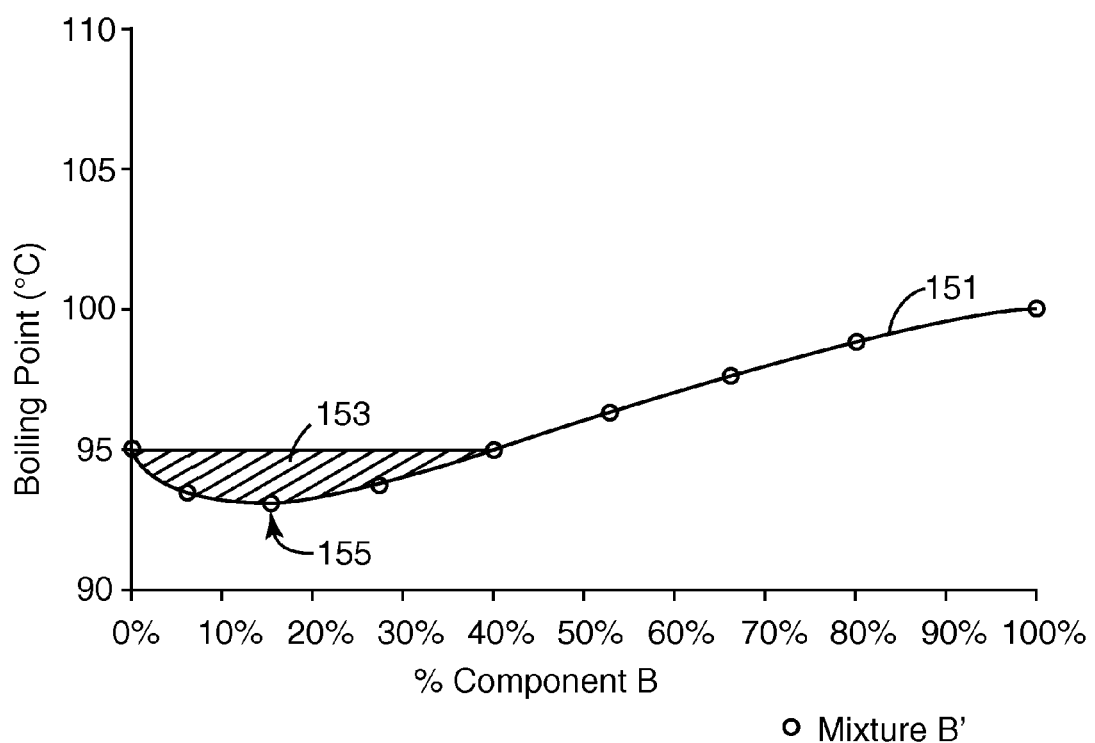

TERNARY AZEOTROPES CONTAINING 1,1,1,2,2,3,4,5,5,5-DECAFLUORO-3-METHOXY-4-(TRIFLUOROMETHYL)-PENTANE 5 AND COMPOSITIONS MADE THEREFROM

FIELD

This invention relates to compositions containing a ternary azeotrope of 1,1,1,2,2,3,4,5,5,5-decafluoro-3-methoxy-4-(trifluoromethyl)pentane, trans-1,2-dichloroethylene, and a third component, and methods of using these compositions to clean substrates, deposit coatings, transfer thermal energy, and lubricate working operations.

BACKGROUND

Chlorofluorocarbons (CFCs), hydrochlorofluorocarbons (HCFCs), and hydrochlorocarbons (HCCs, e.g., 1,1,1-trichloroethane and carbon tetrachloride) have been used as solvents in a wide variety of applications such as drying, cleaning (e.g., the removal of flux residues from printed circuit boards), and vapor degreasing. These materials have also been used in refrigeration and heat-transfer processes. However, the photolytic and homolytic reactivity at the chlorine-containing carbon sites have been shown to contribute to depletion of the earth's ozone layer. Additionally, the long atmospheric lifetime of CFCs has been linked to global warming. As a result, there has been a world-wide movement to replace CFCs.

The characteristics sought in replacements, in addition to low ozone depletion potential, typically include boiling point ranges suitable for a variety of solvent cleaning applications, low flammability, and low toxicity. For some applications, solvent replacements also have the ability to dissolve both hydrocarbon-based and fluorocarbon-based soils. In some embodiments, solvent replacements also have low toxicity, have no flash points (as measured by ASTM D3278-96 e-1, "Flash Point of Liquids by Small Scale Closed-Cup Apparatus"), have acceptable stability, have short atmospheric lifetimes, and have low global warming potentials.

Hydrofluoroethers (HFEs) have been used as replacements for CFCs and HCFCs. Generally, HFEs are chemically stable, have low toxicity, are non-flammable, and are non-ozone depleting. In some instances, HFEs can form azeotropes with one or more co-solvents to modify or enhance the solvent characteristics of the HFE. Many azeotropes possess properties that make them useful solvents. For example, azeotropes have a constant boiling point that avoids boiling temperature drift during processing and use. In addition, when an azeotrope is used as a solvent, the properties remain constant because the composition does not change during boiling or reflux. Azeotropes that are used as solvents also can be recovered conveniently by distillation.

SUMMARY

There is a need for compositions that have good solvent strength, low flammability and that are non-ozone depleting, and/or have a relatively short atmospheric lifetime so that they do not significantly contribute to global warming (i.e., low global warming potential). There is also a need for solvents that have properties that remain constant during boiling or reflux. Compositions that include provided and described ternary azeotropes of HFEs, trans-1,2-dichloroethylene, and some common alcohols have been discovered that can extend the range of applications covered by HFEs.

Briefly, in one aspect, compositions are provided that include a blend of 1,1,1,2,2,3,4,5,5,5-decafluoro-3-methoxy-4-(trifluoromethyl)-pentane, trans-1,2-dichloroethylene and a third component. The third component is selected from (i) methanol, wherein the composition, when fractionally distilled, forms a distillate fraction that is an azeotrope consisting essentially of about 18.6 weight percent of 1,1,1,2,2,3,4,5,5,5-decafluoro-3-methoxy-4-(trifluoromethyl)pentane, 73.0 weight percent of trans-1,2-dichloroethylene, and 8.4 weight percent of methanol, the distillate fraction boiling at about 40° C. at ambient pressure; (ii) ethanol, wherein the composition, when fractionally distilled, forms a distillate fraction that is an azeotrope consisting essentially of about 20.2 weight percent of 1,1,1,2,2,3,4,5,5,5-decafluoro-3-methoxy-4-(trifluoromethyl)pentane, 75.3 weight percent of trans-1,2-dichloroethylene, and 4.5 weight percent of ethanol, the distillate fraction boiling at about 45° C. at ambient pressure; (iii) isopropanol, wherein the composition, when fractionally distilled, forms a distillate fraction that is an azeotrope consisting essentially of about 20.5 weight percent of 1,1,1,2,2,3,4,5,5,5-decafluoro-3-methoxy-4-(trifluoromethyl)pentane, 77.3 weight percent of trans-1,2-dichloroethylene, and 2.2 weight percent of isopropanol, the distillate fraction boiling at about 45° C. at ambient pressure; (iv) t-butanol, wherein the composition, when fractionally distilled, forms a distillate fraction that is an azeotrope consisting essentially of about 21.0 weight percent of 1,1,1,2,2,3,4,5,5,5-decafluoro-3-methoxy-4-(trifluoromethyl)pentane, 77.8 weight percent of trans-1,2-dichloroethylene and 1.2 weight percent of t-butanol, the distillate fraction boiling at about 46° C. at ambient pressure; and (v) 1-propanol, wherein the composition, when fractionally distilled, forms a distillate fraction that is an azeotrope consisting essentially of 24.5 weight percent of 1,1,1,2,2,3,4,5,5,5-decafluoro-3-methoxy-4-(trifluoromethyl)pentane, 74.9 weight percent of trans-1,2-dichloroethylene and 0.6 weight percent of 1-propanol, the distillate fraction boiling at about 46° C. at ambient pressure.

In another aspect, a process is provided for depositing a coating mixture on a surface that includes applying a coating material that includes one of the above compositions to at least a portion of a surface, wherein the at least one coating material is soluble or dispersible in the provided composition. Also, a process is provided for lubricating metal, cermet, or composite wherein said process uses a lubricating fluid comprising one of the above-described provided compositions.

In yet another aspect, a process is provided for assisting in the removal of contaminants from the surface of a substrate that includes contacting the substrate with one or more of the above-described provided compositions until the contaminants are dissolved, dispersed, or displaced in or by the composition, and removing the composition containing the dissolved, dispersed or displaced contaminants from the surface of the substrate. Also, a process is provided for heat transfer wherein one or more of the provided compositions described above can be used as a heat-transfer fluid.

In this application:

"consisting essentially of" or "consists essentially of" indicates that the three components of a blend need to be present to form a ternary azeotrope in the composition. Other ingredients may be present in the blend that do not interfere with the formation of the desired ternary azeotrope; and "ambient pressure" refers to atmospheric pressure that ranges from 720 to 740 torr.

The provided compositions and processes have utility in a number of applications including providing solvents for cleaning, providing solvents for coating depositions, and as heat transfer fluids. The provided compositions are relatively high strength solvents that can extend the range of applications provided by hydrofluoroethers (HFEs).

The above summary is not intended to describe each disclosed embodiment of every implementation of the present invention. The brief description of the drawing and the detailed description which follows more particularly exemplify illustrative embodiments.

BRIEF DESCRIPTION OF THE DRAWINGS

FIG. 1 is a schematic diagram of boiling point versus percent component B, illustrating an azeotrope and azeotrope-like region.

DETAILED DESCRIPTION

In the following description, reference is made to the accompanying set of drawings that form a part of the description hereof and in which are shown by way of illustration several specific embodiments. It is to be understood that other embodiments are contemplated and may be made without departing from the scope or spirit of the present invention. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

An azeotropic composition, or azeotrope, includes a mixture of two or more substances that behaves like a single substance in which the vapor produced by partial evaporation of the liquid azeotropic composition at its boiling point has the same composition as the liquid. Ternary azeotropes include a mixture of three substances that behave like a single substance in which the vapor has the same composition as the liquid. For the provided compositions it has been surprisingly found that certain alcohols that include methanol, ethanol, isopropanol, t-butanol, and 1-propanol can form ternary azeotropes with trans-1,2-dichloroethylene, and 1,1,1,2,2,3,4,5,5,5-decafluoro-3-methoxy-4-(trifluoromethyl)pentane.

Azeotropic compositions are constant boiling point mixtures that exhibit either a maximum boiling point that is higher than, or a minimum boiling point that is lower than, each of the individual components. To define terminology, FIG. 1 will be used. Shown in FIG. 1 is a hypothetical mixture B'. Mixture B' comprises components A and B. Mixture B' is plotted as boiling point versus percent component B and is represented as curve 151. In FIG. 1, the boiling points of the individual components, A and B, are 95° C., and 100° C., respectively. The azeotrope of mixture B' is represented by 155. This azeotrope has a boiling point that is lower than both component A and B. Compositions that include azeotropes boil at temperatures that are either above each of the individual components or below the boiling point of the each of the individual components. Compositions in region 153 (represented by the shaded area) of mixture B' includes between greater than 0% and less than 40% of component B and have boiling points that are lower than both component A and B. As can be seen in FIG. 1, the azeotrope composition is included in the range of compositions for a particular mixture of substances. A ternary azeotrope and compositions that include the azeotrope may similarly be plotted to produce a three-dimensional volume, like the area 153.

The provided compositions include 1,1,1,2,2,3,4,5,5,5-decafluoro-3-methoxy-4-(trifluoromethyl)pentane, trans-1,2-dichloroethylene, and a third component, which is selected from methanol, ethanol, isopropanol, t-butanol, and 1-propanol. The concentration of the three components in the provided compositions may vary substantially from the corresponding azeotropic composition, and the magnitude of this permissible variation depends upon the specific third component. In some embodiments, the provided composition comprises essentially the same concentrations of the 1,1,1,2,2,3,4,5,5,5-decafluoro-3-methoxy-4-(trifluoromethyl)pentane, trans-1,2-dichloroethylene, and the third component, as comprise the azeotrope formed between them at ambient pressure. In some embodiments, provided compositions exhibit no significant change in the solvent power of the composition over time.

In addition to the 1,1,1,2,2,3,4,5,5,5-decafluoro-3-methoxy-4-(trifluoromethyl)pentane, trans-1,2-dichloroethylene, and a third component, other compounds that do not form azeotropes with any of the components (i.e., binary, tertiary, or higher order azeotropes) may be present. Typically, the other compounds are present in small amounts. For example, in some embodiments, co-solvents or surfactants may be present to, for example, improve the dispersibility or the solubility of intended solutes (such as water, soils, or coating materials (e.g., perfluoropolyether lubricants and fluoropolymers)), in a provided composition. In some embodiments, small amounts of lubricious additives may be present to, for example, enhance the lubricating properties of provided compositions.

In some embodiments, the provided compositions include a composition that includes a blend of 1,1,1,2,2,3,4,5,5,5-decafluoro-3-methoxy-4-(trifluoromethyl)pentane, trans-1,2-dichloroethylene, and a third component, wherein the third component is selected from (i) methanol, wherein the composition, when fractionally distilled, forms a distillate fraction that is an azeotrope consisting essentially of about 18.6 weight percent of 1,1,1,2,2,3,4,5,5,5-decafluoro-3-methoxy-4-(trifluoromethyl)pentane, 73.0 weight percent of trans-1,2-dichloroethylene, and 8.4 weight percent of methanol, the distillate fraction boiling at about 40° C. at ambient pressure; (ii) ethanol, wherein the composition, when fractionally distilled, forms a distillate fraction that is an azeotrope consisting essentially of about 20.2 weight percent of 1,1,1,2,2,3,4,5,5,5-decafluoro-3-methoxy-4-(trifluoromethyl)pentane, 75.3 weight percent of trans-1,2-dichloroethylene, and 4.5 weight percent of ethanol, the distillate fraction boiling at about 45° C. at ambient pressure; (iii) isopropanol, wherein the composition, when fractionally distilled, forms a distillate fraction that is an azeotrope consisting essentially of about 20.5 weight percent of 1,1,1,2,2,3,4,5,5,5-decafluoro-3-methoxy-4-(trifluoromethyl)pentane, 77.3 weight percent of trans-1,2-dichloroethylene, and 2.2 weight percent of isopropanol, the distillate fraction boiling at about 45° C. at ambient pressure; (iv) t-butanol, wherein the composition, when fractionally distilled, forms a distillate fraction that is an azeotrope consisting essentially of about 21.0 weight percent of 1,1,1,2,2,3,4,5,5,5-decafluoro-3-methoxy-4-(trifluoromethyl)pentane, 77.8 weight percent of trans-1,2-dichloroethylene and 1.2 weight percent of t-butanol, the distillate fraction boiling at about 46° C. at ambient pressure; and (v) 1-propanol, wherein the composition, when fractionally distilled, forms a distillate fraction that is an azeotrope consisting essentially of 24.5 weight percent of 1,1,1,2,2,3,4,5,5,5-decafluoro-3-methoxy-4-(trifluoromethyl)pentane, 74.9 weight percent of trans-1,2-dichloroethylene and 0.6 weight percent of 1-propanol, the distillate fraction boiling at about 46° C. at ambient pressure.

In other embodiments the concentrations of 1,1,1,2,2,3,4,5,5,5-decafluoro-3-methoxy-4-(trifluoromethyl)pentane, trans-1,2-dichloroethylene, and the third component in the provided composition differ from the concentrations of such components in the corresponding azeotrope by no more than about ten percent. In other words, the provided compositions may include a blend that consists essentially of 1,1,1,2,2,3,4,5,5,5-decafluoro-3-methoxy-4-(trifluoromethyl)pentane, trans-1,2-dichloroethylene, and a third component wherein the concentrations differs from that of the azeotrope by up to about ten percent (above or below the concentrations of the ternary azeotrope at any given pressure. If the third component is methanol then the blend consists essentially of from about 16.7 to about 20.5 weight percent of 1,1,1,2,2,3,4,5,5,5-decafluoro-3-methoxy-4-(trifluoromethyl)pentane, from about 65.7 to about 80.3 weight percent of trans-1,2-dichloroethylene, and from about 7.6 to about 9.2 weight percent of methanol. This blend, when fractionally distilled, forms a distillate fraction that is an azeotrope that boils about 40° C. at ambient pressure. If the third component is ethanol then the blend consists essential of from about 18.2 to about 22.2 weight percent of 1,1,1,2,2,3,4,5,5,5-decafluoro-3-methoxy-4-(trifluoromethyl)pentane, from about 67.8 to about 82.8 weight percent of trans-1,2-dichloroethylene, and from about 4.1 to about 5.0 weight percent of ethanol. This blend, when fractionally distilled, forms a distillate fraction that is an azeotrope that boils about 45° C. at ambient pressure. If the third component is isopropanol, then the blend consists essentially of from about 18.5 to about 22.6 weight percent of 1,1,1,2,2,3,4,5,5,5-decafluoro-3-methoxy-4-(trifluoromethyl)pentane, from about 69.6 to about 85.0 weight percent of trans-1,2-dichloroethylene, and from about 2.0 to about 2.4 weight percent of isopropanol. This blend, when fractionally distilled, forms a distillate fraction that is an azeotrope that boils about 45° C. at ambient pressure. If the third component is t-butanol, then the blend consists essentially of from about 18.9 to about 23.1 weight percent of 1,1,1,2,2,3,4,5,5,5-decafluoro-3-methoxy-4-(trifluoromethyl)pentane, from about 70.0 to about 85.6 weight percent of trans-1,2-dichloroethylene, and from about 1.1 to about 1.3 weight percent of t-butanol. This blend, when fractionally distilled, forms a distillate fraction that is an azeotrope that boils about 46° C. at ambient pressure. Finally, if the third component is 1-propanol, then the blend consists essentially of from about 22.1 to about 27.0 weight percent of 1,1,1,2,2,3,4,5,5,5-decafluoro-3-methoxy-4-(trifluoromethyl)pentane, from about 67.4 to about 82.4 weight percent of trans-1,2-dichloroethylene, and from about 0.5 to about 0.7 weight percent of 1-propanol. This blend, when fractionally distilled, forms a distillate fraction that is an azeotrope that boils about 46° C. at ambient pressure.

In other embodiments, the provided compositions may include a blend that consists essentially of 1,1,1,2,2,3,4,5,5,5-decafluoro-3-methoxy-4-(trifluoromethyl)pentane, trans-1,2-dichloroethylene, and a third component wherein the concentrations differs from that of the azeotrope by no more than 5 percent. If the third component is methanol then the blend consists essentially of from about 17.7 to about 19.5 weight percent of 1,1,1,2,2,3,4,5,5,5-decafluoro-3-methoxy-4-(trifluoromethyl)pentane, from about 69.4 to about 76.7 weight percent of trans-1,2-dichloroethylene, and from about 8.0 to about 8.8 weight percent of methanol. This blend, when fractionally distilled, forms a distillate fraction that is an azeotrope that boils about 40° C. at ambient pressure. If the third component is ethanol then the blend consists essentially of from about 19.2 to about 21.2 weight percent of 1,1,1,2,2,3,4,5,5,5-decafluoro-3-methoxy-4-(trifluoromethyl)pentane, from about 71.5 to about 79.1 weight percent of trans-1,2-dichloroethylene, and from about 4.3 to about 4.7 weight percent of ethanol. This blend, when fractionally distilled, forms a distillate fraction that is an azeotrope that boils about 45° C. at ambient pressure. When the third component is isopropanol then the blend consists essentially of from about 19.5 to about 21.5 weight percent of 1,1,1,2,2,3,4,5,5,5-decafluoro-3-methoxy-4-(trifluoromethyl)pentane, from about 73.4 to about 81.2 weight percent of trans-1,2-dichloroethylene, and from about 2.1 to about 2.3 weight percent of isopropanol. This blend, when fractionally distilled, forms a distillate fraction that is an azeotrope that boils about 45° C. at ambient pressure. When the third component is t-butanol then the blend consists essentially of from about 20.0 to about 22.1 weight percent of 1,1,1,2,2,3,4,5,5,5-decafluoro-3-methoxy-4-(trifluoromethyl)pentane, from about 73.9 to about 81.7 weight percent of trans-1,2-dichloroethylene, and from about 1.1 to about 1.3 weight percent of t-butanol. This blend, when fractionally distilled, forms a distillate fraction that is an azeotrope that boils about 46° C. at ambient pressure. Finally, when the third component is 1-propanol then the blend consists essentially of from about 23.3 to about 25.7 weight percent of 1,1,1,2,2,3,4,5,5,5-decafluoro-3-methoxy-4-(trifluoromethyl)pentane, from about 71.2 to about 78.6 weight percent of trans-1,2-dichloroethylene, and from about 0.57 to about 0.63 weight percent of 1-propanol. This blend, when fractionally distilled, forms a distillate fraction that is an azeotrope that boils about 46° C. at ambient pressure.

As is known in the art, the composition of any azeotrope, including the provided ternary azeotropes, will vary with pressure, e.g., as the ambient pressure increases, the boiling point of a liquid increases, and similarly, as the ambient pressure decreases, the boiling point of a liquid decreases. In some embodiments, the provided are homogeneous; i.e., they form a single phase under ambient conditions (i.e., at room temperature and atmospheric pressure).

The provided compositions can be prepared by mixing the desired amounts of 1,1,1,2,2,3,4,5,5,5-decafluoro-3-methoxy-4-(trifluoromethyl)pentane, trans-1,2-dichloroethylene, and the third component, and any other minor components (e.g., surfactants or lubricious additives) together using conventional mixing means. The components may be added in any order.

In some embodiments, the provided compositions can be used in cleaning processes. In other embodiments, the provided compositions can be used in heat-transfer processes, for example as a refrigerant. In still other embodiments, the provided compositions can be used as a lubricating fluid, or as a coating liquid. Various different solvent cleaning and/or decontamination techniques are known in the art. In one embodiment, a cleaning process can be carried out by contacting a contaminated substrate with one of the compositions provided herein until the contaminants on the substrate are substantially dissolved, dispersed, or displaced in or by the provided composition. The contaminants can then be removed by rinsing the substrate with fresh, uncontaminated compositions provided herein or by removing a substrate immersed in the provided compositions from a bath and permitting the contaminated composition to flow off of the substrate. The provided compositions can be used in either the vapor or the liquid state (or both), and any of the known techniques for "contacting" a substrate can be used. For example, provided compositions, if in their liquid state, can be sprayed or brushed onto the substrate, the provided compositions, if in their vapor state can be blown across the substrate, or the substrate can be immersed in either a vaporous or liquid provided composition. In some embodiments, elevated temperatures, ultrasonic energy, and/or agitation can be used to facilitate cleaning.

In some embodiments, the provided compositions can be useful for removing contaminants during semiconductor fabrication. For example, an integrated circuit or other small component can be exposed to the provided compositions to remove material not wanted on a surface, including photoresist residue, post-ion implant residue, post-etch residue, particulates, and even water. In some embodiments, exemplary processes described herein can be used to clean organic and/or inorganic substrates. Representative examples of substrates include: metals; ceramics; glass; silicon wafers; polymers; natural fibers (and fabrics derived there from) for example, cotton, silk, linen, wool, ramie, fur, leather, and suede; synthetic fibers (and fabrics derived therefrom) for example, polyester, rayon, acrylics, nylon, polyolefin, acetates, triacetates, and blends thereof; fabrics comprising natural and synthetic fibers; and combinations (e.g., laminates, mixtures, blends, etc.) of the foregoing materials. In some embodiments, the process described herein can be especially useful in the precision cleaning of electronic components (e.g., circuit boards); optical or magnetic media; and medical devices and medical articles for example syringes, surgical equipment, implantable devices, and prosthesis.

In some embodiments, provided cleaning and/or decontamination processes that include provided compositions can be used to dissolve or remove most contaminants from the surface of a substrate. For example, materials such as light hydrocarbon contaminants; higher molecular weight hydrocarbon contaminants such as mineral oils, greases, cutting and stamping oils and waxes; fluorocarbon contaminants such as perfluoropolyethers, bromotrifluoroethylene oligomers (gyroscope fluids), and chlorotrifluoroethylene oligomers (hydraulic fluids, lubricants); silicone oils and greases; photoresist, solder fluxes; particulates; and other contaminants encountered in precision, electronic, metal, and medical device cleaning can be removed. In some embodiments, the provided cleaning processes can be particularly useful for the removal of hydrocarbon contaminants (especially, light hydrocarbon oils), fluorocarbon contaminants, photoresist and particulates.

In some embodiments, the provided compositions can also be used in coating deposition applications, where the provided composition functions as a carrier or solvent for a coating material to enable deposition of the material on the surface of a substrate, thus providing a coating mixture comprising the provided composition and a process for depositing a coating on a substrate surface using the composition. The provided process includes applying to at least a portion of a substrate a coating of a coating mixture that includes a provided composition and at least one coating material that is soluble or dispersible in the provided composition. The coating mixture can further comprise one or more additives (e.g., surfactants, coloring agents, stabilizers, anti-oxidants, flame retardants, and the like). Typically, the process further comprises the step of removing the provided composition from the deposited coating by, e.g., allowing evaporation (which can be aided by the application of, e.g., heat or vacuum). Coating materials that can be deposited by the process include: pigments, silicone lubricious additives, stabilizers, adhesives, anti-oxidants, dyes, polymers, pharmaceuticals, cosmetics, release agents, inorganic oxides, and the like, and combinations thereof Other materials include: perfluoropolyethers, hydrocarbons, and silicone lubricious additives; amorphous copolymers of tetrafluoroethylene; polytetrafluoroethylene; and combinations thereof Representative examples of materials suitable for use in the process include: titanium dioxide, iron oxides, magnesium oxide, perfluoropolyethers, polysiloxanes, stearic acid, acrylic adhesives, polytetrafluoroethylene, amorphous copolymers of tetrafluoroethylene, and combinations thereof. Any of the substrates described above (for decontamination applications) can be coated. Particularly useful in one embodiment, is coating electrical connectors with perfluoropolyether lubricants or medical devices with silicone lubricious additives.

To form a coating mixture, the components of the mixture (i.e., the provided composition, the coating material(s), and any additive(s) used) can be combined by any conventional mixing technique used for dissolving, dispersing, or emulsifying coating materials, e.g., by mechanical agitation, ultrasonic agitation, manual agitation, and the like. The provided composition and the coating material(s) can be combined in any ratio depending upon the desired thickness of the coating. In some embodiments, the coating material(s) comprise from about 0.1 to about 10 weight percent of the coating composition. Exemplary deposition processes of this disclosure can be carried out by applying the coating mixture to a substrate by any conventional technique. For example, the mixture can be brushed or sprayed (e.g., as an aerosol) onto the substrate, or the substrate can be spin-coated. In some embodiments, the substrate can be coated by immersion in the composition. Immersion can be carried out at any suitable temperature and can be maintained for any convenient length of time. If the substrate is a tube, such as a catheter, and it is desired to ensure that the composition coats the lumen wall of the catheter, it may be advantageous to draw the composition into the lumen by the application of reduced pressure.

In some embodiments, after a coating is applied to a substrate, the provided composition can be removed from the deposited coating by evaporation. In some embodiments, the rate of evaporation can be accelerated by application of reduced pressure or mild heat. The coating can be of any desired thickness. Generally, the thickness will be determined by, for example, such factors as the viscosity of the coating material, the temperature at which the coating is applied, and the rate of withdrawal (if immersion is used).

In some embodiments, the provided compositions can be used as heat-transfer fluids in heat-transfer processes where the heat-transfer fluids can transfer thermal energy (e.g., heat) either in a direct or indirect manner. Direct heat transfer (sometimes called "direct contact heat transfer") refers to a heat-transfer process wherein a heat-transfer fluid conducts heat directly to and/or from a heat sink or source to a fluid by directly contacting the fluid with the heat sink or source. Examples of direct heat transfer include the immersion cooling of electrical components and the cooling of an internal combustion engine.

Indirect heat transfer refers to a heat-transfer process wherein a heat-transfer fluid conducts heat to and/or from a heat sink or source without directly contacting the fluid with the heat sink or source. Examples of indirect heat transfer include: refrigeration, air conditioning and/or heating (e.g., using heat pumps) processes, such as are used in buildings, vehicles, and stationary machinery. In some embodiments, a process for transferring heat is provided that includes employing a provided composition as a secondary loop refrigerant or as a primary loop refrigerant. In these embodiments, the secondary loop refrigerant (i.e., a wide temperature range liquid fluid) provides a means for transferring heat between the heat source and the primary loop refrigerant (i.e., a low temperature-boiling fluid, which accepts heat by e.g., expanding to a gas and rejects heat by being condensed to a liquid, typically by using a compressor). Examples of equipment in which the provided compositions may be useful include: centrifugal chillers, household refrigerator/freezers, automotive air conditioners, refrigerated transport vehicles, heat pumps, supermarket food coolers and display cases, and cold storage warehouses.

In indirect heat-transfer processes, lubricious additives for heat transfer can be incorporated in the heat-transfer fluid where moving parts (e.g., pumps and valves) are involved to ensure that the moving parts continue to work over long periods of time. Generally, these lubricious additives should possess good thermal and hydrolytic stability and should exhibit at least partial solubility in the heat-transfer fluid. Examples of suitable lubricious additives include: mineral oils, fatty esters, highly halogenated oils such as chlorotrifluoroethylene-containing polymers, and synthetic lubricious additives such as alkylene oxide polymers. The provided compositions can also function as a working fluid in an organic Rankin cycle, for example to recover energy from sources such as waste heat from industrial processes, geothermal heat, or solar heat.

In some embodiments, the provided compositions can be used to formulate working fluids or lubricants that comprise the provided compositions and at least one fully volatile lubricious additive. A lubricious additive is defined herein as an additive that modifies the coefficient of friction between a work piece and tooling. In some embodiments, provided compositions with the lubricious additive form the working fluid for a tooling operation. Exemplary substrates in working operations include: metal, cermet, and composite work pieces. Cermets are semi synthetic-products consisting of a mixture of ceramic and metallic components having physical properties not found solely in either one alone. Composites are described herein as combinations (e.g., laminate, mixture, blend, etc.) of high temperature fibers in a polymer matrix, for example, a glass or carbon fiber in an epoxy resin. Examples of exemplary substrates include: metal carbides, oxides, and silicides. Exemplary metals include: refractory metals (e.g., tantalum, niobium, molybdenum, vanadium, tungsten, hafnium, rhenium, and titanium); precious metals (e.g., silver, gold, and platinum); high temperature metals (e.g., nickel, titanium alloys, and nickel chromes); other metals including, for example, magnesium, copper, aluminum, steel (e.g., stainless steels); alloys (e.g., brass, and bronze); and any combinations thereof. Typically, working fluids lubricate machining surfaces, resulting in a smooth and substantially residue-free machined work piece surface. In some embodiments, exemplary working fluids used in these operations also cool the machining environment (e.g., the surface interface between a work piece and a machining tool) by, for example, removing heat and/or particulate matter therefrom.

In some embodiments, a working fluid is formulated so that the cutting and forming processes are lubricated to reduce friction, heat build-up in the tool or work piece, and/or prevent material transfer from the work piece to the tool. In some embodiments, a working fluid fully wets the working tooling. In some embodiments, the provided composition included in the working liquid evaporates from the working tool and work piece. In some embodiments, the lubricious additive is present as a thin film that reduces friction and heat build-up on the surfaces of the tool and work piece, and/or prevents material transfer from the work piece to the tooling. Generally, the lubricious additive is selected such that it is sufficiently high in boiling point to lubricate the working process without evaporating prematurely and still low enough in boiling point to fully evaporate from the working process so that little or no residue remains (i.e., is volatile). Examples of lubricious additives for working operations include: esters of $C_8$ to $C_{14}$ fatty acids, alkylene glycol ethers, hydrocarbon distillates, and esters of lactic acid.

In each of the described uses, the provided composition can be used as such, or a blend of provided compositions may be used, provided the blend can also form an azeotrope. Similarly, minor amounts of co-solvents can be added to the provided compositions, as long as the addition does not disrupt the azeotropic behavior. Useful co-solvents may include, for example, hydrofluorocarbons (HFCs), hydrocarbons, hydrochlorocarbons (HCCs), or water. Representative examples of suitable co-solvents include: carbon dioxide; 1,1-difluoroethane; 1-hydropentadecafluoroheptane; 1,1,1,2-tetrafluoroethane; 1,1,1,3,3-pentafluoropropane; 2-chloropropane; water; saturated perfluorochemicals (e.g., perfluoropentane, perfluorohexane, and perfluoro(N-methylmorpholine)); and combinations thereof. In some embodiments, the provided compositions may further comprise hydrofluoric acid (HF).

Objects and advantages of this invention are further illustrated by the following examples, but the particular materials and amounts thereof recited in these examples, as well as other conditions and details, should not be construed to unduly limit this invention.

EXAMPLES

The preparation, identification, and testing of the compositions of this disclosure are further described in the following examples. The particular materials and amounts thereof recited in these examples, as well as other conditions and details, should not be construed to unduly limit this invention. In these examples, all percentages, proportions and ratios are by weight unless otherwise indicated.

The 1,1,1,2,2,3,4,5,5,5-decafluoro-3-methoxy-4-(trifluoromethyl)-pentane (NOVEC 7300 Engineered Fluid) may be obtained from 3M Company, St. Paul, Minn., trans-1,2-dichloroethylene, and the various alcohols were obtained from Aldrich Chemical Company, Inc. (Milwaukee, Wis.)

Examples 1-5

Mixtures of 1,1,1,2,2,3,4,5,5,5-decafluoro-3-methoxy-4-(trifluoromethyl)-pentane, trans-1,2-dichloroethylene and either methanol, ethanol, 1-propanol, 2-propanol or t-butanol were distilled at ambient pressure (720 to 740 torr). The distillate fractions were analyzed to identify whether these mixtures formed a ternary azeotrope, and if so, the composition (% by weight) and boiling point (b.p.° C.) of the azeotrope, using the following procedure. The mixtures were prepared and distilled at ambient pressure (720 to 740 torr) in a concentric tube distillation column (Model 933 available from Ace Glass, Vinland, N.J.). In each case, the distillation was allowed to equilibrate at total reflux for at least 60 minutes. For each distillation, five successive distillate samples, each approximately 10 percent by volume of the total liquid charge, were taken while operating the column at a liquid reflux ratio of 10 to 1. The compositions of the distillate samples were then analyzed using an AGILENT 7890 Gas Chromatograph with a NUKOL capillary column (available from Supelco, Bellefonte, Pa.) or a QUADREX 007 Series Methyl Silicone capillary column (available from Quadrex Corporation, New Haven, Conn.) and a thermal conductivity detector. The boiling point of each distillate was measured using a thermocouple. The ambient pressure was measured using a calibrated pressure transducer (available from Omega Engineering, Inc., Stamford, Conn.). The presence of an azeotrope was confirmed by a distillate vapor temperature below the boiling point of the three individual components and a relatively constant distillate composition. For each distillation, the average composition and temperature of the final four distillate fractions were calculated. This average composition was then prepared and distilled according to this method. This procedure was repeated a third time for each mixture. Using this procedure, the following azeotropes listed in Table I were identified. The reported composition and boiling point for each azeotrope is the average for the three successive distillations. The reported pressures encompass the range of pressures measured during these distillations.

TABLE 1

| Example | | Composition | bp (° C.) | Pressure torr (kPa) |
|---|---|---|---|---|
| 1 | 18.6% | 1,1,1,2,2,3,4,5,5,5-decafluoro-3-methoxy-4-(trifluoromethyl)-pentane | 40 | 728-731 (97.1-97.5) |
| | 73.0% | trans-1,2-dichloroethylene | | |
| | 8.4% | methanol | | |
| 2 | 20.2% | 1,1,1,2,2,3,4,5,5,5-decafluoro-3-methoxy-4-(trifluoromethyl)-pentane | 45 | 729-740 (97.2-98.7) |
| | 75.3% | trans-1,2-dichloroethylene | | |
| | 4.5% | ethanol | | |
| 3 | 20.5% | 1,1,1,2,2,3,4,5,5,5-decafluoro-3-methoxy-4-(trifluoromethyl)-pentane | 45 | 728-730 (97.1-97.3) |
| | 77.3% | trans-1,2-dichloroethylene | | |
| | 2.2% | isopropyl alcohol | | |
| 4 | 21.0% | 1,1,1,2,2,3,4,5,5,5-decafluoro-3-methoxy-4-(trifluoromethyl)-pentane | 46 | 730-731 (97.3-97.5) |
| | 77.8% | trans-1,2-dichloroethylene | | |
| | 1.2% | t-butanol | | |
| 5 | 24.5% | 1,1,1,2,2,3,4,5,5,5-decafluoro-3-methoxy-4-(trifluoromethyl)-pentane | 46 | 720-728 (96.0-97.1) |
| | 74.9% | trans-1,2-dichloroethylene | | |
| | 0.6% | methanol | | |

Example 6

A circuit board having dimensions of 2.5 centimeter×6 centimeters was coated with NC-SMQ230 lead-free solder paste (available from Indium Corporation of America, Utica, N.Y. USA). The solder paste was reflowed at 240° C. for 5 minutes in a forced air convection oven. The board was then cooled to room temperature. The soldered test board was then immersed for 2 minutes into a boiling mixture containing the azeotrope of Example 2 (20.2 weight percent of 1,1,1,2,2,3,4,5,5,5-decafluoro-3-methoxy-4-(trifluoromethyl)-pentane, 75.3 weight percent trans-1,2-dichloroethylene and 4.5 weight percent ethanol). Upon removal from the mixture, visual inspection of the board indicated that the all of the solder flux residue had been removed.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows. All references cited in this disclosure are herein incorporated by reference in their entirety.

What is claimed is:

1. A composition comprising a blend of 1,1,1,2,2,3,4,5,5,5-decafluoro-3-methoxy-4-(trifluoromethyl)pentane, trans-1,2-dichloroethylene, and a third component, wherein the third component is selected from:
   (i) methanol, wherein the composition, when fractionally distilled, forms a distillate fraction that is an azeotrope consisting essentially of about 18.6 weight percent of 1,1,1,2,2,3,4,5,5,5-decafluoro-3-methoxy-4-(trifluoromethyl)pentane, 73.0 weight percent of trans-1,2-dichloroethylene, and 8.4 weight percent of methanol, the distillate fraction boiling at about 40° C. at ambient pressure;
   (ii) ethanol, wherein the composition, when fractionally distilled, forms a distillate fraction that is an azeotrope consisting essentially of about 20.2 weight percent of 1,1,1,2,2,3,4,5,5,5-decafluoro-3-methoxy-4-(trifluoromethyl)pentane, 75.3 weight percent of trans-1,2-dichloroethylene, and 4.5 weight percent of ethanol, the distillate fraction boiling at about 45° C. at ambient pressure;
   (iii) isopropanol, wherein the composition, when fractionally distilled, forms a distillate fraction that is an azeotrope consisting essentially of about 20.5 weight percent of 1,1,1,2,2,3,4,5,5,5-decafluoro-3-methoxy-4-(trifluoromethyl)pentane, 77.3 weight percent of trans-1,2-dichloroethylene, and 2.2 weight percent of isopropanol, the distillate fraction boiling at about 45° C. at ambient pressure;
   (iv) t-butanol, wherein the composition, when fractionally distilled, forms a distillate fraction that is an azeotrope consisting essentially of about 21.0 weight percent of 1,1,1,2,2,3,4,5,5,5-decafluoro-3-methoxy-4-(trifluoromethyl)pentane, 77.8 weight percent of trans-1,2-dichloroethylene and 1.2 weight percent of t-butanol, the distillate fraction boiling at about 46° C. at ambient pressure; and
   (v) 1-propanol, wherein the composition, when fractionally distilled, forms a distillate fraction that is an azeotrope consisting essentially of 24.5 weight percent of 1,1,1,2,2,3,4,5,5,5-decafluoro-3-methoxy-4-(trifluoromethyl)pentane, 74.9 weight percent of trans-1,2-dichloroethylene and 0.6 weight percent of 1-propanol, the distillate fraction boiling at about 46° C. at ambient pressure.

2. A composition according to claim 1, wherein the concentrations of 1,1,1,1,2,2,3,4,5,5,5-decafluoro-3-methoxy-4-(trifluoromethyl)pentane, trans-1,2-dichloroethylene, and the third component in the composition differ from the concentrations of such components in the corresponding azeotrope by no more than about ten percent.

3. A composition according to claim 1 wherein the concentrations of the 1,1,1,2,2,3,4,5,5,5-decafluoro-3-methoxy-4-(trifluoromethyl)pentane, trans-1,2-dichloroethylene, and the third component in the composition differ from the concentrations of such components in the corresponding azeotrope by no more than about five percent.

4. A composition according to claim 1 wherein the composition is an azeotrope.

5. A composition according to claim 1 comprising a blend of 1,1,1,2,3,3-hexafluoro-3-methoxy-propane, trans-1,2-dichloroethylene and a third component, wherein the third component is selected from:
  (i) methanol, wherein the blend consists essentially of from about 16.7 to about 20.5 weight percent of 1,1,1,2,2,3,4,5,5,5-decafluoro-3-methoxy-4-(trifluoromethyl)pentane, from about 65.7 to about 80.3 weight percent of trans-1,2-dichloroethylene, and from about 7.6 to about 9.2 weight percent of methanol;
  (ii) ethanol, wherein the blend consists essentially of from about 18.2 to about 22.2 weight percent of 1,1,1,2,2,3,4,5,5,5-decafluoro-3-methoxy-4-(trifluoromethyl)pentane, from about 67.8 to about 82.8 weight percent of trans-1,2-dichloroethylene, and from about 4.1 to about 5.0 weight percent of ethanol;
  (iii) isopropanol, wherein the blend consists essentially of from about 18.5 to about 22.6 weight percent of 1,1,1,2,2,3,4,5,5,5-decafluoro-3-methoxy-4-(trifluoromethyl)pentane, from about 69.6 to about 85.0 weight percent of trans-1,2-dichloroethylene, and from about 2.0 to about 2.4 weight percent of isopropanol;
  (iv) t-butanol, wherein the blend consists essentially of from about 18.9 to about 23.1 weight percent of 1,1,1,2,2,3,4,5,5,5-decafluoro-3-methoxy-4-(trifluoromethyl)pentane, from about 70.0 to about 85.6 weight percent of trans-1,2-dichloroethylene, and from about 1.1 to 1.3 weight percent of t-butanol; and
  (v) 1-propanol, wherein the blend consists essentially of from about 22.1 to about 27.0 weight percent of 1,1,1,2,2,3,4,5,5,5-decafluoro-3-methoxy-4-(trifluoromethyl)pentane, from about 67.4 to about 82.4 weight percent of trans-1,2-dichloroethylene, and from about 0.5 to 0.7 weight percent of 1-propanol.

6. A composition according to claim 1 comprising a blend of 1,1,1,2,3,3-hexafluoro-3-methoxy-propane, trans-1,2-dichloroethylene and a third component, wherein the third component is selected from:
  (i) methanol, wherein the blend consists essentially of from about 17.7 to about 19.5 weight percent of 1,1,1,2,2,3,4,5,5,5-decafluoro-3-methoxy-4-(trifluoromethyl)pentane, from about 69.4 to about 76.7 weight percent of trans-1,2-dichloroethylene, and from about 8.0 to about 8.8 weight percent of methanol;
  (ii) ethanol, wherein the blend consists essentially of from about 19.2 to about 21.2 weight percent of 1,1,1,2,2,3,4,5,5,5-decafluoro-3-methoxy-4-(trifluoromethyl)pentane, from about 71.5 to about 79.1 weight percent of trans-1,2-dichloroethylene, and from about 4.3 to about 4.7 weight percent of ethanol;
  (iii) isopropanol, wherein the blend consists essentially of from about 19.5 to about 21.5 weight percent of 1,1,1,2,2,3,4,5,5,5-decafluoro-3-methoxy-4-(trifluoromethyl)pentane, from about 73.4 to about 81.2 weight percent of trans-1,2-dichloroethylene, and from about 2.1 to about 2.3 weight percent of isopropanol;
  (iv) t-butanol, wherein the blend consists essentially of from about 20.0 to about 22.1 weight percent of 1,1,1,2,2,3,4,5,5,5-decafluoro-3-methoxy-4-(trifluoromethyl)pentane, from about 73.9 to about 81.7 weight percent of trans-1,2-dichloroethylene, and from about 1.1 to 1.3 weight percent of t-butanol; and
  (v) 1-propanol, wherein the blend consists essentially of from about 23.3 to about 25.7 weight percent of 1,1,1,2,2,3,4,5,5,5-decafluoro-3-methoxy-4-(trifluoromethyl)pentane, from about 71.2 to about 78.6 weight percent of trans-1,2-dichloroethylene, and from about 0.57 to 0.63 weight percent of 1-propanol.

7. A composition that includes an azeotropic mixture comprising a blend of 1,1,1,2,2,3,4,5,5,5-decafluoro-3-methoxy-4-(trifluoromethyl)pentane, trans-1,2-dichloroethylene, and a third component wherein the blend is selected from:
  (i) about 18.6 weight percent of 1,1,1,2,2,3,4,5,5,5-decafluoro-3-methoxy-4-(trifluoromethyl)pentane, about 73.0 weight percent of trans-1,2-dichloroethylene, and about 8.4 weight percent of methanol;
  (ii) about 20.2 weight percent of 1,1,1,2,2,3,4,5,5,5-decafluoro-3-methoxy-4-(trifluoromethyl)pentane, about 75.3 weight percent of trans-1,2-dichloroethylene, and about 4.5 weight percent of ethanol;
  (iii) about 20.5 weight percent of 1,1,1,2,2,3,4,5,5,5-decafluoro-3-methoxy-4-(trifluoromethyl)pentane, about 77.3 weight percent of trans-1,2-dichloroethylene, and about 2.2 weight percent of isopropanol;
  (iv) about 21.0 weight percent of 1,1,1,2,2,3,4,5,5,5-decafluoro-3-methoxy-4-(trifluoromethyl)pentane, about 77.8 weight percent of trans-1,2-dichloroethylene, and about 1.2 weight percent of t-butanol; and
  (v) about 24.5 weight percent of 1,1,1,2,2,3,4,5,5,5-decafluoro-3-methoxy-4-(trifluoromethyl)pentane, about 74.9 weight percent of trans-1,2-dichloroethylene, and about 0.6 weight percent of 1-propanol.

8. A coating mixture comprising:
a coating material; and
a composition according to claim 1.

9. A coated article comprising a coating mixture according to claim 8.

10. A heat transfer fluid comprising a composition according to claim 1.

11. A cleaning fluid comprising a composition according to claim 1.

12. A process for cleaning electronic devices comprising:
providing an electronic device; and
contacting the device with a composition according to claim 1.

13. A process for depositing a coating on a substrate comprising applying the coating mixture according to claim 8 to at least a portion of the substrate.

14. A working fluid comprising the composition according to claim 1 and a lubricious additive.

15. A working fluid according to claim 14, wherein said lubricious additive is volatile.

16. A composition according to claim 1, further comprising hydrofluoric acid.

17. A process for lubricating metal, cermet, or composite, wherein said process is lubricated using the working fluid of claim 14.

18. A process for removing contaminants from a substrate comprising:
   contacting the substrate with one or more compositions according to claim 1;
   dissolving, dispersing, or displacing contaminants in or by the composition, and
   removing the composition containing the contaminants from the surface of the substrate.

19. A process for heat transfer wherein at least one of the compositions according to claim 1 is used as a heat-transfer fluid.

* * * * *